US006748109B1

(12) United States Patent
Yamaguchi

(10) Patent No.: US 6,748,109 B1
(45) Date of Patent: Jun. 8, 2004

(54) DIGITAL LABORATORY SYSTEM FOR PROCESSING PHOTOGRAPHIC IMAGES

(75) Inventor: Hiroshi Yamaguchi, Kanagawa (JP)

(73) Assignee: Fuji Photo Film Co., LTD, Kanagawa (JP)

( * ) Notice: Subject to any disclaimer, the term of this patent is extended or adjusted under 35 U.S.C. 154(b) by 0 days.

(21) Appl. No.: 09/333,964

(22) Filed: Jun. 16, 1999

(30) Foreign Application Priority Data

Jun. 16, 1998 (JP) .......................................... 10-168767

(51) Int. Cl.[7] .............................. G06K 9/00; G06K 9/40
(52) U.S. Cl. ...................................... 382/167; 382/254
(58) Field of Search ................................ 382/162, 165, 382/167, 254; 358/504, 515, 518, 519, 520, 524, 534, 521

(56) References Cited

U.S. PATENT DOCUMENTS

| | | | | |
|---|---|---|---|---|
| 5,109,274 A | * | 4/1992 | Washio et al. ............... 358/518 |
| 5,144,419 A | * | 9/1992 | Nakatsuka et al. .......... 358/534 |
| 5,438,437 A | * | 8/1995 | Mizoguchi et al. .......... 358/518 |
| 5,781,315 A | | 7/1998 | Yamaguchi .................. 358/520 |
| 6,091,518 A | * | 7/2000 | Anabuki ...................... 358/500 |
| 6,118,896 A | * | 9/2000 | Ohnuma ...................... 382/167 |
| 6,198,550 B1 | * | 3/2001 | Toyoda ........................ 358/514 |
| 6,307,651 B1 | * | 10/2001 | Ohtani et al. ................ 358/524 |

* cited by examiner

Primary Examiner—Andrew W. Johns
Assistant Examiner—Amir Alavi
(74) Attorney, Agent, or Firm—Birch, Stewart, Kolasch & Birch, LLP

(57) ABSTRACT

There is provided an image processing method and apparatus in which an image represented by output image data can be corrected in a simple manner. After execution of pre-scan has been completed, in a set-up portion, a normal-processing parameter and a correction-processing parameter are set for each of a plurality of image processing. When an image displayed on a monitor after image processing based on a normal-processing parameter is visually observed by an operator and it is determined that correction of the image is required, at least one image processing parameter is switched to a correction-processing parameter. That is, when it is determined that correction of an image is required, a previously set correction-processing parameter is read and the normal-processing parameter is switched thereto.

10 Claims, 5 Drawing Sheets

FIG. 5

|  | COLOR GRADATION CONVERTING PROCESSING | HYPERTONE PROCESSING | HYPER-SHARPNESS PROCESSING |
| --- | --- | --- | --- |
| NORMAL PROCESSING PARAMETER | Ad | $\alpha d$ | Xd |
| PARAMETER 1 FOR CORRECTION | A1 | $\alpha 1$ | X1 |
| PARAMETER 2 FOR CORRECTION | A2 | $\alpha 2$ | X2 |

DIGITAL LABORATORY SYSTEM FOR PROCESSING PHOTOGRAPHIC IMAGES

BACKGROUND OF THE INVENTION

1. Field of the Invention

The present invention relates to an image processing method and apparatus, and particularly to an image processing method and apparatus in which output image data is obtained by effecting image processing for original image data.

2. Description of the Related Art

There has been known in recent years a technology in which frame images recorded on a photographic film are photoelectrically read by a reading sensor such as a CCD, image processing such as enlargement/reduction or various corrections is performed for digital image data obtained by the reading, and based on the digital image data subjected to the image processing, images are formed on a recording material by modulated laser light.

In the technology in which frame images are read by a reading sensor such as a CCD in a digital manner, in order to realize accurate image reading, a frame image is preliminary read (so-called pre-scan), reading conditions corresponding to density of the frame image, and the like (for example, an amount of light irradiated on the frame image, charge accumulation time in a CCD, and the like) are determined, and the frame image is read again based on the determined reading conditions (so-called fine scan).

An image processing condition in performing image processing is set by calculation based on digital image data (pre-scan data) obtained by performing pre-scan. In this case, an image outputted by using digital image data, which has been subjected to image processing based on the set image processing condition, may be tested by an operator. That is, it is determined whether a frame image recorded on a film is outputted accurately. For example, in a case of photographing a human subject against light, if exposure is performed so that the human subject becomes a suitable image, a bright portion such as the sky becomes white. On the other hand, if exposure is performed so that the sky becomes a suitable image, the human subject becomes dark. As described above, there is a possibility that a region corresponding to any one of a bright portion (highlight) or a dark portion (shadow) of an output image loses in detail so that the frame image recorded on the film may not be accurately outputted. In this case, the operator indicates correction of an image.

When the operator indicates correction of an image, an image processing condition is calculated again based on pre-scan data and the image processing condition is thereby corrected. Subsequently, when image processing is performed for the pre-scan data based on the corrected image processing condition and an image is outputted using digital image data subjected to image processing, the frame image recorded on the film is accurately outputted.

However, there is recently a tendency of plural kinds of image processing operations being carried out for digital image data obtained by reading a frame image recorded on a film. For this reason, the calculation performed for correction of the image processing condition becomes complicated and requires a lot of time, as the number of image processing operations performed for the digital image data increases. Further, the calculation for correcting the image processing condition is executed separately from the calculation for setting the image processing condition. Accordingly, there is a problem that a lot of time is required until the image processing condition is corrected and an image represented by output image data, which is generated by performing the image processing based on the corrected image processing condition, that is, a frame image recorded on a film is accurately outputted.

SUMMARY OF THE INVENTION

The present invention has been devised in order to solve the above-described problems and an object thereof is to provide an image processing method and apparatus, in which an image represented by output image data can be corrected in a simple manner.

In order to achieve the above-described object, in accordance with a first aspect of the present invention, there is provided an image processing apparatus which effects image processing for original image data so as to obtain output image data, comprising:

processing content setting means which sets, based on the original image data, a plurality of kinds of processing contents of at least one kind of image processing for the original image data;

output means which outputs, based on a specified processing content among the plurality of kinds of processing contents set by the processing content setting means, an image represented by the output image data generated by effecting at least one kind of image processing for the original image data;

input means for inputting information which indicates correction of the image outputted by the output means; and processing content switching means which, when information which indicates correction of the image is inputted by the input means, switches the processing content of image processing effected for the original image data to another processing content among the plurality of kinds of processing contents.

The image processing apparatus according to the first aspect of the present invention is provided with the processing content setting means which sets a plurality of kinds of processing contents of at least one kind of image processing among a plurality of image processing effected for original image data. The processing content is, for example, comprised of information which indicates that a plurality of previously set image processing are each performed or not, and information which indicates a processing condition of image processing to be performed. The image processing includes gradation conversion processing effected correspondingly to a picture pattern of an image represented by original image data, local density adjustment processing of an image represented by original image data, distortion correcting processing for correcting distortion in an image represented by original image data, and color/density correcting processing for an entire region of an image represented by original image data.

Further, the image processing apparatus also includes the output means which outputs an image represented by output image data generated by effecting image processing having a specified processing content for the original image data. The output means is comprised of display means for displaying an image, and display control means which estimates an image represented by the output image data and displays the image on the display means. As the display means, for example, a recording material or a CRT can be used. An output state of the image outputted by the output means varies in accordance with conditions made at the time of recording the image on a film (for example, photographing by back-lighting, or not). Accordingly, when the image outputted by the output means is not in a desired output state, correction of the image is needed. Therefore, the image processing apparatus includes the input means for inputting information which indicates correction of the image. As the input means, for example, a keyboard or a mouse can be used. The information can be inputted by an operator's manual operation. Namely, when the image outputted by the output means is visually observed by the operator and it is determined that correction of the image is needed, the operator inputs the information indicating correction of the image via the input means.

The image processing apparatus also includes the processing content switching means which switches a processing content of image processing for original image data. Namely, when the information which indicates correction of an image is inputted by the input means, the processing content is switched to other processing content among the plurality of kinds of processing contents set in advance by the processing content setting means.

As described above, a plurality of kinds of processing contents of image processing for the original image data are set in advance, and only by switching the processing content to other one when the information which indicates correction of an image is inputted, the processing content of image processing can be altered. This makes it possible to correct the image in a simple manner. As a result, the time required for outputting the corrected image can be shortened and the number of operations can be reduced.

In accordance with a second aspect of the present invention, there is provided an image processing apparatus according to the first aspect, wherein the plurality of kinds of processing contents set by the processing content setting means include processing contents which are set so that processing conditions of a specified image processing differ from one another, and when information which indicates correction relating to the specified image processing is inputted via the input means, the processing content switching means switches a processing content of the specified image processing to other processing content.

The processing content setting means provided in the image processing apparatus relating to the second aspect of the present invention allows setting of the processing contents in which processing conditions of the specified image processing operation differ from one another. The input means can input information which indicates correction of an image relating to the specified image processing, for example, information corresponding to the processing conditions set by the processing content setting means. The processing content switching means switches the processing content to other one based on the information inputted by the input means.

As described above, when the image outputted by the output means is corrected, the processing content of image processing can be altered only by switching the processing content of the specified image processing operation based on the inputted information. For this reason, the image can be corrected in a simple manner. Accordingly, the time required for outputting the corrected image can be shortened and the number of operations can be reduced.

In accordance with a third aspect of the present invention, there is provided an image processing apparatus according to the first aspect, wherein when the processing content of the specified image processing is switched to other different processing content, the processing content switching means further switches at least one processing content of at least another image processing relating to the specified image processing to different another processing content.

When at least one processing content of any specified image processing is changed, the processing content switching means changes at least one processing content of the specified image processing, and further changes at least one processing content for other image processing relating to the specified image processing. At this time, the processing content setting means is preferably provided to set in advance at least one processing content of the related other image processing so as to respectively correspond to the at least one processing content for the specified image processing.

As a result, when an image outputted by the output means is corrected, only by inputting information indicating correction relating to the specified image processing using the input means, at least one processing content of the related image processing can also be changed together with the at least one processing content of the specified image processing. For this reason, an image can be corrected in a simple manner. Accordingly, the time required for outputting the corrected image can be shortened and the number of operations can be reduced.

In accordance with a fourth aspect of the present invention, there is provided an image processing apparatus according to the first aspect, wherein when a plurality of kinds of image processing are effected for the original image data, the processing content switching means simultaneously switches respective processing contents of the plurality of kinds of image processing to other processing contents.

When the plurality of kinds of image processing are effected for the original image data, the processing content setting means sets a plurality of kinds of processing contents for each of the plurality of image processing. At this time, in a case in which the information indicating correction of the image is inputted, if respective processing contents of each of the plurality of image processing are sequentially switched, the time required for outputting the corrected image increases. Accordingly, in the processing content switching means of the image processing apparatus relating to the fourth aspect, when the information which indicates correction of an image is inputted and the processing content of image processing for the original image data is switched to other one, respective processing contents are switched to other processing contents simultaneously.

As a result, the time required for switching the processing content of image processing for the original image data can be shortened and the time required for outputting the corrected image can also be shortened.

In accordance with a fifth aspect of the present invention, there is provided an image processing apparatus according to claim 1, wherein the plurality of kinds of processing contents set by the processing content setting means include a basic processing content which forms a foundation of processing content of image processing for the original image data, and when information which indicates correction of an image is inputted by the input means, the processing content switching means switches processing content to the basic processing content, and thereafter, changes processing content based on the inputted information.

When the corrected image is further corrected and the number of image processing operations, from the original image data, increases, the quality of an image to be outputted deteriorates. Accordingly, the processing content setting means provided in the image processing apparatus of the fifth aspect of the present invention sets a plurality of kinds of processing contents including basic processing content which form a foundation of processing content of image processing for the original image data. For example, when processing contents for a plurality of kinds of image processing are set, the plurality of kinds of processing contents set for each image processing include basic processing contents of the image processing. At this time, by providing, in the image processing apparatus, selecting means for setting the basic processing contents from the plurality of kinds of processing contents set by the processing content setting means, arbitrary processing contents may also be selected to be set as the basic processing contents.

Further, when information which indicates processing correction of an image is inputted by the input means, the content switching means first switches processing content to the basic processing content, and thereafter, switches to processing content based on the inputted information. Namely, when an image outputted by the output means is corrected, image data based on the basic processing contents is necessarily corrected.

For example, when the image outputted by the output means is not brought into a desired output state irrespective of correction based on switched image processing content and further correction is required, the image is returned to an output state prior to correction (that is, the correction is canceled), and thereafter, the image is corrected based on other switched processing content. As a result, in the image processing apparatus of the present invention, a desired output image can be obtained without causing deterioration in the quality of an image.

In accordance with a sixth aspect of the present invention, there is provided an image processing method in which image processing is effected for original image data so as to obtain output image data, comprising:

a processing content setting step in which a plurality of kinds of processing contents of at least one kind of image processing for the original image data is set based on the original image data;

an output step in which an image represented by the output image data generated by effecting at least one kind of image processing for the original image data is outputted based on a specified processing content among the plurality of kinds of processing contents set in the processing content setting step;

an input step in which information which indicates correction of the image outputted in the output step is inputted; and a processing content switching step in which when information which indicates correction of the image is inputted in the input step, the specified processing content is switched to another processing content among the plurality of kinds of processing contents.

BRIEF DESCRIPTION OF THE DRAWINGS

FIG. 5 is a diagram for illustrating sets of parameters according to other embodiment.

DESCRIPTION OF THE PREFERRED EMBODIMENTS

An embodiment of the present invention will be hereinafter described with reference to the attached drawings. Below, a description will be made for the case of a digital laboratory system according to the present embodiment.

Figure 1:
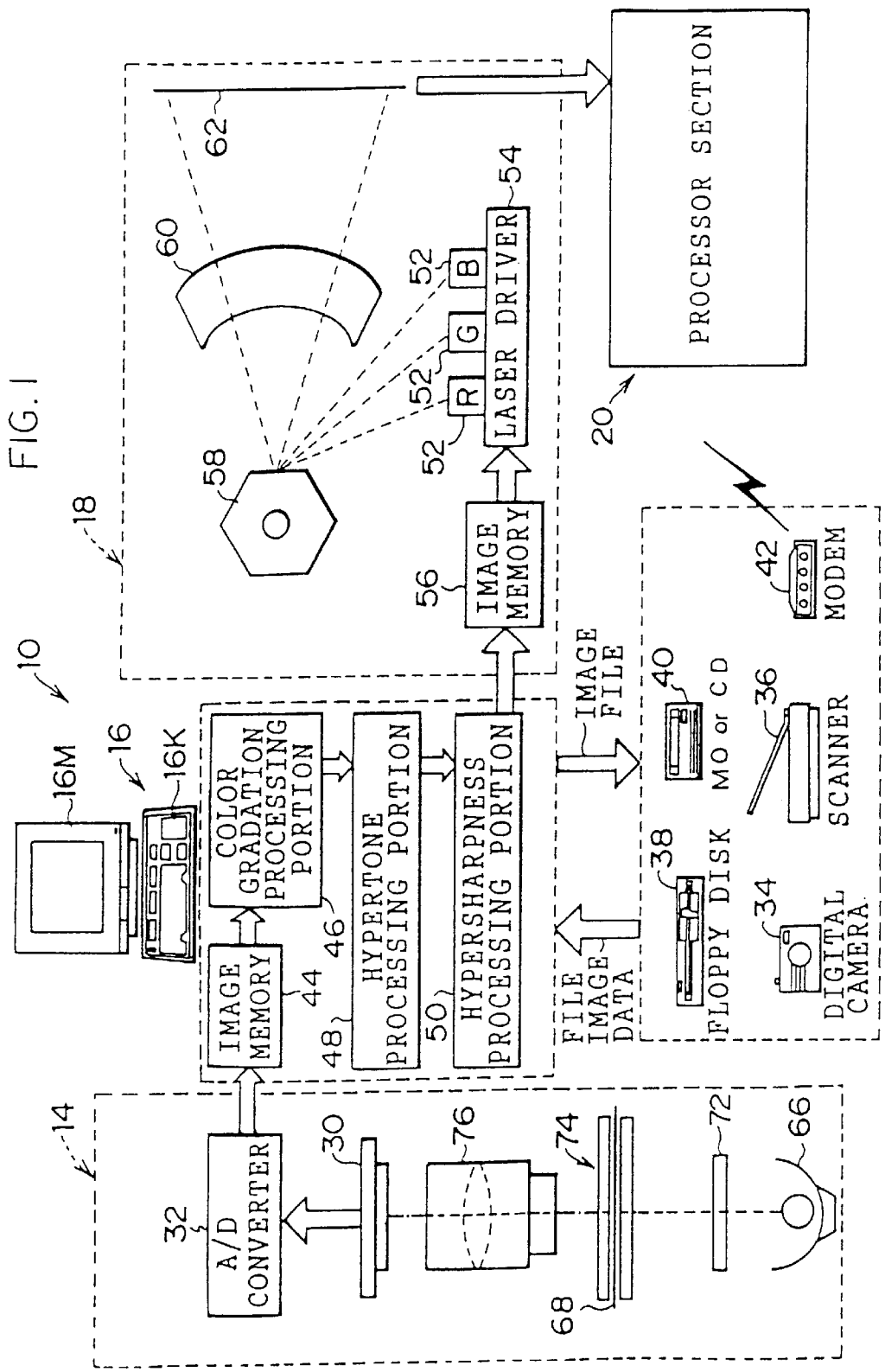
FIG. 1 is a schematic structural diagram of a digital laboratory system according to an embodiment of the present invention.
Figure 2:
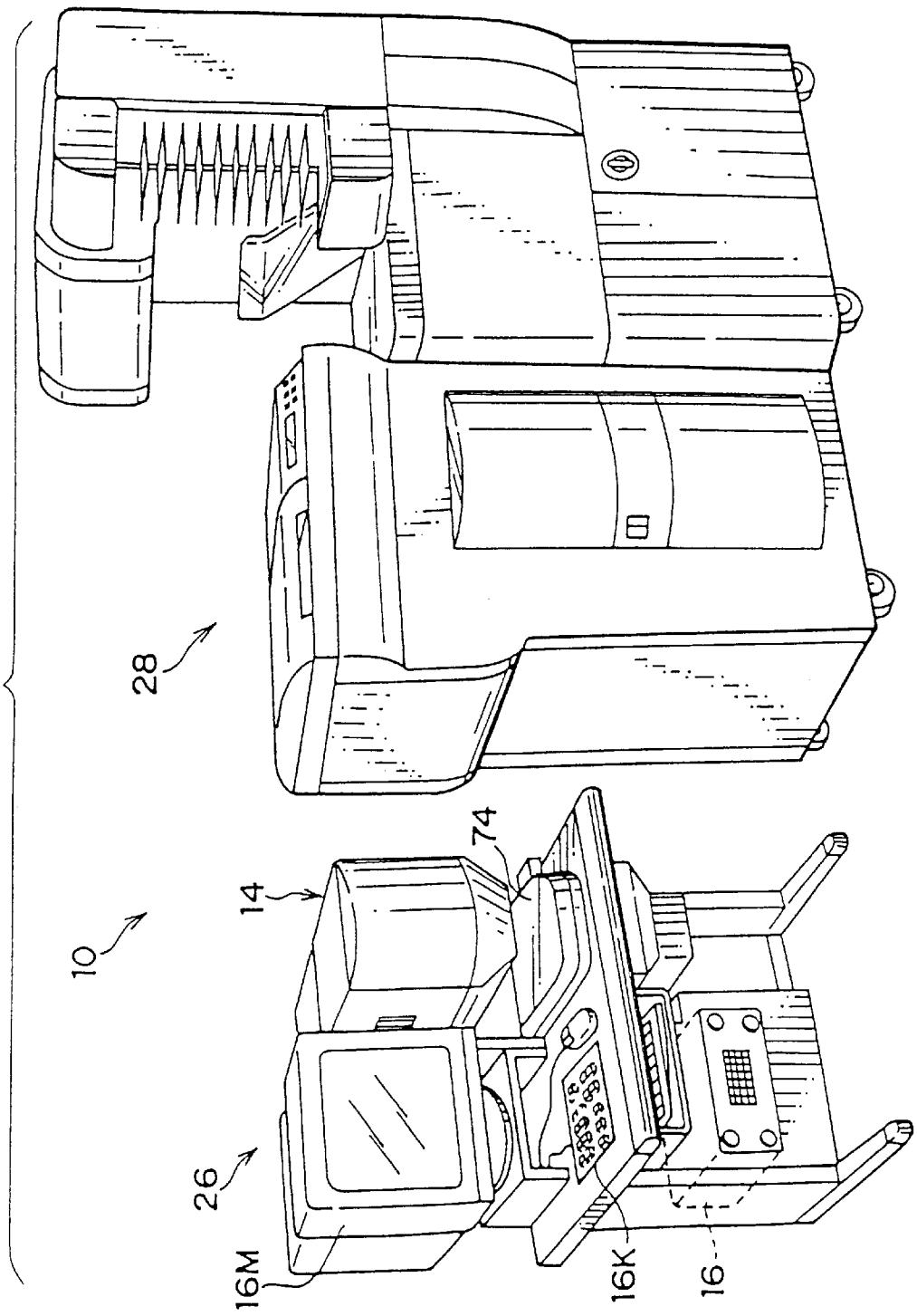
FIG. 2 is an outside view of the digital laboratory system.

Schematic Structure of an Entire System:

FIGS. 1 and 2 each show a schematic structure of a digital laboratory system 10 according to the present embodiment.

As shown in FIG. 1, the digital laboratory system 10 is structured to include a line CCD scanner 14, an image processing section 16, a laser printer section 18, and a processor section 20. The line CCD scanner 14 and the image processing section 16 are integrated to form an input section 26 shown in FIG. 2 and the laser printer section 18 and the processor section 20 are integrated to form an output section 28 shown in FIG. 2.

The line CCD scanner 14 is used to read frame images recorded on a photographic film such as a negative film or a reversal film. Examples of the photographic film on which frame images to be read are recorded include a photographic film in 135 magazines, a photographic film in 110 magazines, a photographic film with a transparent magnetic layer formed thereon (i.e., a photographic film in 240 magazines: a so-called APS film), and photographic films in 120 magazines and 220 magazines (Brownie size). The line CCD scanner 14 reads the above-described frame images to be read by a line CCD 30 and makes A/D conversion in an A/D converter 32, and thereafter, outputs image data to the image processing section 16.

In the present embodiment, a description will be given in the case of the digital laboratory system 10 to which a photographic film in 240 magazines (APS film) 68 is applied.

The image processing section 16 is structured so that image data (scan image data) outputted from the line CCD scanner 14, image data obtained by photographing using a digital camera 34 or the like, image data obtained by reading an original (for example, a reflection original) by a scanner 36 (of the flat-bed type), image data generated by other computers and recorded in a floppy disk drive 38 and in an MO or CD drive 40, and communication image data received via a modem 42 (these image data will all be generically referred to as file image data) from the outside, are inputted thereto.

The image processing section 16 stores the inputted image data in an image memory 44 and performs image processing including various corrections in a color gradation processing portion 46, a hypertone processing portion 48, a hyper-sharpness processing portion 50, or the like, and further outputs the image data, as recording image data, to the laser printer section 18. The image processing section 16 is also allowed to output the image data subjected to the image processing, as an image file, to the outside (for example, to output the image data to a storage medium such as FD, MO, or CD, or transmit the image data to other information processing equipment via a communication line).

The laser printer section 18 includes laser light sources 52 of R, G, and B and applies laser light modulated in correspondence with the recording image data (temporarily stored in an image memory 56) inputted from the image processing section 16 onto a photographic printing paper by controlling a laser driver 54, and records an image on the photographic printing paper 62 by scan exposure (in the present embodiment, an optical system mainly using a polygon mirror 58 and an fθ lens 60). Further, the processor section 20 performs various processing including color development, bleach-fix, washing, and drying for the photographic printing paper 62 on which images are recorded by scan exposure in the laser printer section 18. As a result, images are formed on the photographic printing paper.

Structure of line CCD scanner:

Next, the structure of the line CCD scanner 14 will be described. FIG. 1 shows a schematic structure of an optical system of the line CCD scanner 14. This optical system includes a light source 66 which applies light to the photographic film 68. A light diffusion plate 72 by which the light applied to the photographic film 68 is made into diffused light is disposed at a light-emission side of the light source 66.

The photographic film 68 is conveyed by a film carrier 74, which is disposed at a side where the light diffusion plate 72 is provided, in such a manner that an image plane of each frame image is located perpendicular to an optical axis.

A lens unit 76 which allows image formation of light transmitted through the frame image, and the line CCD 30 are sequentially disposed along the optical axis at the side of the photographic film 68 opposite to the side at which the light source 66 is disposed. Although only a single lens is shown as the lens unit 76, the lens unit 76 is practically a zoom lens comprised of a plurality of lenses. Further, a SELFOC lens may also be used as the lens unit 76. In this case, it is preferable that both end surfaces of the SELFOC lens are located close to the photographic film 68 and the line CCD 30, respectively, as far as possible.

The line CCD 30 is structured in such a manner that three sensing portions each including a plurality of CCD cells arranged in a row along a transverse direction of the photographic film 68 being conveyed and further including an electronic shutter mechanism are provided in parallel at intervals so as to form three lines and color separation filters of R, G, and B are respectively mounted at light incident sides of the three sensing portions (a so-called three-line color CCD). The line CCD 30 is disposed in such a manner that a light receiving surface of each sensing portion coincides with an image-formation point of the lens unit 76.

Although not illustrated, a shutter is provided between the line CCD 30 and the lens unit 76.

Figure 3:
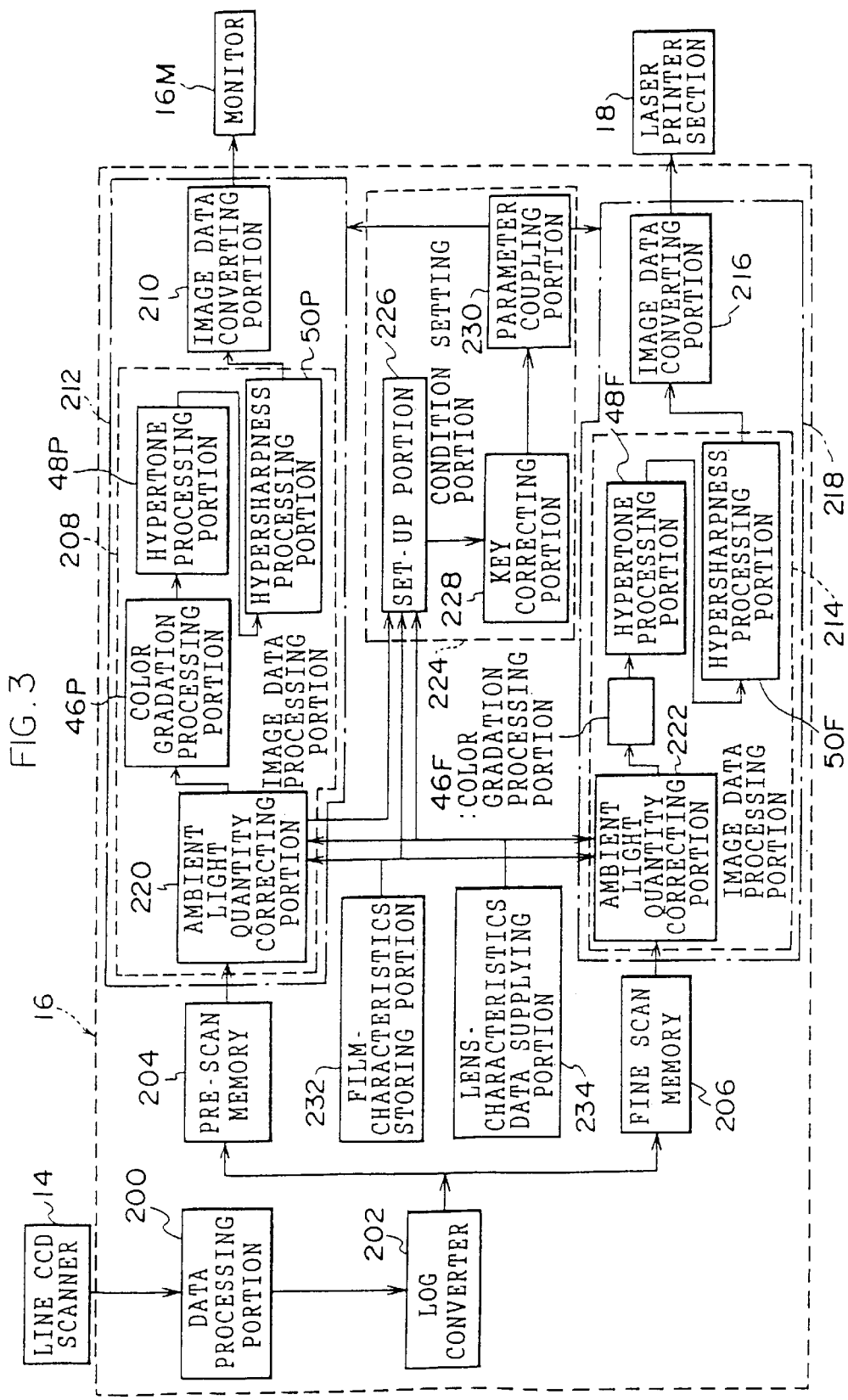
FIG. 3 is a control block diagram of an image processing section.

Structure of control system of image processing section 16:

FIG. 3 shows a detailed control block diagram for performing each of operations in the image memory 44, the color gradation processing portion 46, the hypertone processing portion 48, and the hyper-sharpness processing portion 50, which are main components of the image processing section 16 shown in FIG. 1.

Digital signals of R, G, and B outputted from the line CCD scanner 14 are each subjected to predetermined data processing including darkness correction, defective-pixel correction, shading correction, and the like in a data processing portion 200, and thereafter, these signals are each converted to digital image data (density data) by a Log converter 202. Pre-scan data is stored in a pre-scan memory 204 and main scan data is stored in a main scan memory 206.

The pre-scan data stored in the pre-scan memory 204 is transmitted to a pre-scan processing portion 212 formed by an image data processing portion 208 and an image data converting portion 210. On the other hand, the main scan data stored in the main scan memory 206 is transmitted to a main scan processing portion 218 formed by an image data processing portion 214 and an image data converting portion 216.

In each of the pre-scan processing portion 212 and the main scan processing portion 218, corrections based on lens characteristics at the time of photographing an image and stroboscopic light distribution characteristics at the time of photographing using electronic flash are performed.

The image data processing portions 208 and 214 are respectively structured to include the color gradation processing portions 46P and 46F, the hypertone processing portions 48P and 48F, and the hyper-sharpness processing portions 50P and 50F. Image processing such as contrast adjustment (color gradation converting processing), color conversion, hypertone processing for compressing the gradation of an ultra-low frequency brightness component of an image, and hyper-sharpness processing for highlighting sharpness while controlling (suppressing) graininess is performed by a known method, for example, LUT or matrix (MTX) calculation.

Further, the image data processing portions 208 and 214 respectively includes marginal (peripheral) light quantity correcting portions 220 and 222 which each correct an amount of light around an image (in a background) prior to the above-described adjustment or correction. The marginal light quantity correcting portions 220 and 222 each correct, based on the lens characteristics, reduction in the amount of light around a main subject such as a human figure (in a background).

Connected to the pre-scan processing portion 212 and to the fine scan processing portion 218 is a condition setting portion 224 formed by a set-up portion 226, a key correcting portion 228, and a parameter integrating portion 230.

Figure 4:
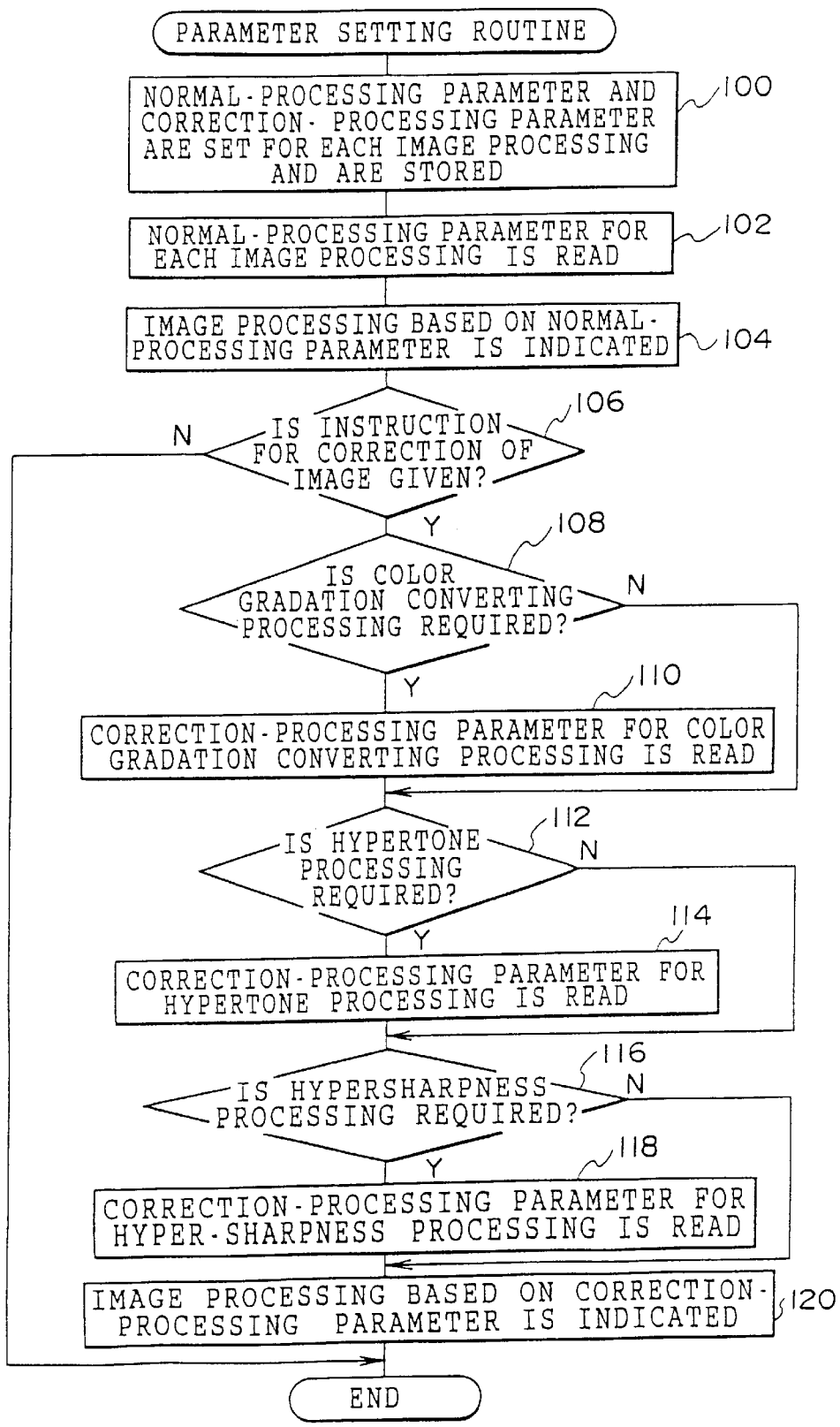
FIG. 4 is a flowchart which shows a parameter setting routine according to the embodiment of the present invention.

The set-up portion 226 is structured to include a microcomputer comprised of CPU, ROM, RAM, and an input/output port (which are all not shown) and stores in advance a parameter setting routine shown in FIG. 4, in which image processing conditions (parameters) for image processing in the pre-scan processing portion 212 and the fine scan processing portion 218 are set and supplied to the parameter integrating portion 230. The set-up portion 226 sets parameters and sets, based on pre-scan data, a reading condition at the time of performing fine scan, and further, supplies the reading condition to the line CCD scanner 14.

The key correcting portion 228 calculates an adjustment amount of a parameter in accordance with various indication inputted by keys for adjusting density, color, contrast, sharpness, saturation, and the like, or a mouse, and further, supplies them to the parameter integrating portion 230.

The parameter integrating portion 230 is provided to transfer the parameters received from the set-up portion 226 and the key correcting portion 228 to the image processing potion 208 for pre-scan and to the image processing portion 214 for fine scan.

A film-characteristics storing portion 232 is connected to the condition setting portion 224 and characteristics of each of various films are stored therein. The film characteristics mentioned herein are gradation characteristics ($\gamma$ characteristics) and are generally represented by a curve in which density varies three-dimensionally in accordance with an exposure amount. Note that the foregoing is a known technology and a detailed description thereof will be omitted.

In order to specify the kind of a film, in the present embodiment, information which indicates the kind of a film is recorded on a magnetic recording layer of an APS film, and when the film is conveyed by the carrier 74 of the line CCD scanner 14, the information can be read by a magnetic head. Further, in the case of a photographic film in 135 magazines, the kind thereof may be determined based on the shape (perforations are formed at relatively short pitches in both ends in a transverse direction of the film) or may be key-inputted by an operator.

A lens-characteristics data supplying portion 234 is connected to the condition setting portion 224. The lens-characteristics data supplying portion 234 acquires information for determining a camera used in photographing with a film and supplies, to the marginal light quantity correcting portions 220 and 222, the lens characteristics in accordance with the photographing camera and in correspondence to the acquired determination information.

That is, the lens-characteristics data supplying portion 234 includes a memory (table), and light distribution characteristics of lenses corresponding to various kinds of cameras (including, for example, a lens applied to a lens-fitted film package, a stroboscope with which an ordinary camera is equipped, and an exchanging lens.) are stored therein. The light distribution characteristic varies depending on a distance from a photographing position, and a plurality of light distribution characteristics corresponding to the distance from a photographing position are stored for each stroboscope.

When an amount of marginal (peripheral) light is corrected based on the above-described lens characteristics, a variation in the amount of light between a human figure, which is a main subject, and a background can be alleviated.

The lens-characteristics data supplying portion 234 reads light distribution characteristics in accordance with the acquired lens-characteristics data (for example, lens characteristics of a lens-fitted film package; the farther the distance from the center of an image is, the more the amount of light decreased $\Delta$ log E increases (that is, the lens characteristics having a tendency toward a minus)), and supplies the same to the marginal light quantity correcting portions 220 and 222. The distance from a photographing position may merely be recorded on a magnetic recording layer in the case of an APS film. Further, in the case of a photographic film in 135 magazines, the distance from a photographing position may be optically recorded or may also be recorded on a separate recording medium.

Operation of the embodiment:

Next, operation of the embodiment of the present invention will be described.

When an operator inserts the photographic film 68 in the film carrier 74 and gives an instruction for starting reading frame images by the keyboard 16K of the image processing section 16, conveying of the photographic film is started in the film carrier 74. As a result, pre-scan is executed. That is, not only frame images, but also various data in a region except for an image recording region of the photographic film 68 are read by the line CCD scanner 14 while conveying the photographic film 68 at a relatively high speed. Accordingly, information of a photographing lens provided in a camera, and information about the film type of the photographic film 68, which is recorded on a magnetic recording layer 70 are read simultaneously. When the size of a frame image recorded on the photographic film 68 is, for example, recognized to be of panorama size, the film is read with a whiteness portion peculiar to a panorama-size image (at sides of both ends in the transverse direction of the photographic film) being shielded.

When pre-scan data is stored in the pre-scan memory 204, the marginal light quantity correcting portion 220 of the pre-scan data processing portion 212 reads pre-scan data and performs correction of an amount of marginal light. The pre-scan data subjected to the correction of an amount of marginal light is inputted to the set-up portion 226 of the condition setting portion 224. When the pre-scan data is inputted to the set-up portion 226, the parameter setting routine shown in FIG. 4 is executed. The parameter setting routine shown in FIG. 4 is in advance stored in the set-up portion 226. The parameter setting routine will hereinafter be described in detail.

First, in step 100, a parameter for normal processing and a parameter for correction processing are set for each image processing and stored. The image processing includes, as described above, color gradation converting processing by the color gradation processing portion 46P, hypertone processing by the hypertone processing portion 48P, and hyper-sharpness processing by the hyper-sharpness processing portion 50P. The normal processing mentioned herein is image processing which is first performed for pre-scan data obtained by pre-scan of a frame image recorded on the photographic film 68. The correction processing is image processing which is executed again for correcting an image when an image displayed on a monitor 16M is not in a desired output state. For example, in a case in which a human figure is photographed against light, when exposure is performed so that the human figure becomes a suitable image, an image in which a bright portion such as the sky becomes white is displayed on the monitor 16M. On the other hand, when exposure is performed so that the sky becomes a suitable image, an image with the human figure being made dark is displayed on the monitor 16M. As described above, the correction processing means image processing which is performed so that both a bright portion (the human figure) and a dark portion (the sky) become suitable in case such as where a region corresponding to the bright portion or dark portion of the image is displayed in a defaced state (loss in detail state).

In the subsequent step 102, a normal-processing parameter calculated in step 100 is read. In step 104, an instruction for performing image processing based on the normal-processing parameter is given to the image data processing portion 208. That is, the image processing which is first performed after completion of pre-scan is provided so as to be performed based on the normal-processing parameter. In the image data processing portion 208, various corrections are made, such as color gradation converting processing by the color gradation processing portion 46P, corrections of brightness and saturation by the hypertone processing portion 48P and the hyper-sharpness processing portion 50P, and the like. The pre-scan data thus subjected to the image processing is outputted to the image data converting portion 210 and is converted to display image data. An image based on the display image data is displayed on the monitor 16M.

An operator visually observes the image displayed on the monitor 16M and determines whether the image is in a desired output state. For example, in the image including a human figure and the sky as described above, a determination is made as to whether both the human figure and the sky are in a suitably displayed state. When the operator determines that the image displayed on the monitor 16M is not in a desired output state, the operator gives an instruction for correction of the image by operating a cancel key provided on the keyboard 16K. On the other hand, when the operator determines that the image displayed on the monitor 16M is in a desired output state, operation of the keyboard 16K is not required.

Accordingly, in step 106, it is determined whether an instruction for correction of the image has been given by the operator. This determination can be made by recognizing whether the cancel key provided on the keyboard 16K has been operated or not.

When in step 106 it is determined that the instruction for correction of the image has been given, the process proceeds to step 108, in which it is determined whether color gradation converting processing is required. This determination can be made by whether or not a predetermined key provided on the keyboard 16K is operated by the operator, and is further made in accordance with an image pattern, and the like of the image displayed on the monitor 16M. When in step 108 it is determined that the color gradation converting processing is required, the process proceeds to step 110. In step 110, a correction-processing parameter for the color gradation converting processing in the color gradation processing portion 46P, which is in advance set in step 100, is read and parameter changing is carried out. Thereafter, the process proceeds to step 112. On the other hand, when it is determined that the color gradation converting processing is not required, step 110 is not executed and the process proceeds to step 112.

In step 112, it is determined whether hypertone processing is required. This determination is made by an operator visually observing the image displayed on the monitor 16M to thereby determine whether adjustment is necessary of density at a localized position in an image, such as a human's face, and further by operator operating or not operating a predetermined key provided on the keyboard 16K. When in step 112 it is determined that the hypertone processing is required, the process proceeds to step 114, in which a correction-processing parameter for the hypertone processing in the hypertone processing portion 48P is read and a parameter changing is carried out. On the other hand, when in step 112 it is determined that the hypertone processing is not required, step 114 is not executed and the process proceeds to step 116.

In step 116, in the same way as in the above-described steps 108 and 112, it is determined whether the hyper-sharpness processing is required. This determination is automatically made by reading information recorded on the magnetic recording layer 70 of the photographic film 68 at the time of performing pre-scan. That is, the determination as to whether the hyper-sharpness processing is required is made in accordance with information of a photographing lens provided in a camera, or the like. For example, when a lens-fitted film package is used, distortion occurs in an image displayed on the monitor 16M due to distortion aberration. In order to correct the distortion, the hyper-sharpness processing is required. When in step 116 it is determined that the hyper-sharpness processing is required, the process proceeds to step 118, in which a correction-processing parameter for the hyper-sharpness processing in the hyper-sharpness processing portion 50P is read and a parameter changing is carried out. On the other hand, when in step 116 it is determined that the hyper-sharpness processing is not required, step 118 is not executed and the process proceeds to step 120.

As described above, by executing the processes from step 108 to step 118 in case where an instruction for correction of an image is given, an image-processing parameter can be changed to a correction-processing parameter. At this time, the correction-processing parameter is in advance set and stored in step 100, and therefore, the image-processing parameter can be changed to the correction-processing parameter simply by reading the stored parameter. That is, it is not necessary to execute calculation processing for setting the correction-processing parameter after an instruction for correction of an image is given. Accordingly, the number of processes can be reduced.

The present embodiment was described in a case in which parameters for a plurality of image processing (color gradation converting processing, hypertone processing, and hyper-sharpness processing) are sequentially changed. However, the parameters may also be changed concurrently. As a result, the time required for changing the parameters, that is, the time required for outputting the corrected image, can be shortened.

In step 120, an instruction for performing image processing based on the correction-processing parameter changed by executing the processes from step 108 to step 118 is given to the image data processing portion 208, and thereafter, this parameter setting routine ends.

In the image data processing portion 208, various corrections including the color gradation converting processing by the color gradation processing portion 46P, corrections of brightness and saturation by the hypertone processing portion 48P and by the hyper-sharpness processing portion 50P, and the like are performed based on the correction-processing parameter. The pre-scan data thus subjected to the image processing is converted to display image data in the image data converting portion 210 and an image based on the display image data is displayed again on the monitor 16M. At this time, the image displayed on the monitor 16M is brought into a desired output state. For example, in the image including a human figure and the sky as described above, both the human figure and the sky are in a suitably displayed state.

When in step 106 it is determined that an instruction for correction of an image has not been given, the image displayed on the monitor 16M is in a desired output state. For this reason, the processes from step 108 to step 120 are not executed and this parameter setting routine ends.

When the image in a desired output state is displayed on the monitor 16M and pre-scan ends, a reading condition at the time of performing fine scan is set for each frame image based on the result of pre-scan of each frame image, and a reading condition at the time of performing fine scan is set for each frame image based on the result of the pre-scan.

When setting of the reading conditions at the time of performing fine scan for all frame images is completed, the photographic film 68 is conveyed in a direction opposite to that of pre-scan, and fine scan for each frame image is performed.

At this time, the photographic film 68 is conveyed in a direction opposite to that of pre-scan, and therefore, the fine scan is performed for frame images sequentially from the final frame to the first frame. The conveying speed at the fine scan is set to be lower than that at the pre-scan, and therefore, a reading resolution at the fine scan is higher than that at the pre-scan correspondingly to the difference in the conveying speed. Further, at the pre-scan, the state of an image (for example, an aspect ratio of a photographed image, a photographing state such as underexposure, normal exposure, overexposure, and super-overexposure, photographing with or without electronic flash being used, and the like) is recognized, and therefore, reading of frame images under proper reading conditions can be achieved.

The fine scan is performed in the same manner as in the pre-scan. An output signal from the line CCD 30 is converted to a digital signal by the A/D converter 32 and is processed in the data processing portion 200 of the image processing section 16, and is further made into fine scan data by the Log converter 202, and is finally transferred to the fine scan memory 206.

When the fine scan data is transferred to the fine scan memory 206, it is read by the fine scan processing portion 218, and in the fine scan processing portion 218, the same image processing as that in the pre-scan processing portion 212 is performed for the data. As a parameter used for the image processing in the image data processing portion 214 of the fine scan processing portion 218, a parameter set in the set-up portion 226 based on the pre-scan data is used.

The fine scan data subjected to predetermined image processing in the image data processing portion 214 is outputted to the image data converting portion 216. In the image data converting portion 216, the fine scan data subjected to the image processing is converted to image data of a color specification system applied to the laser printer section 18 (i.e., printing image data) and is further outputted.

In the laser printer section 18, an image is outputted to a recording material based on the printing image data. As a result, an image in a desired output state is recorded on the recording material.

As described above, the normal-processing parameter and the correction-processing parameter are set in advance and are stored, and therefore, when the image displayed on the monitor 16M is not in a desired output state and correction therefore is required, an image-processing parameter may be set merely by reading the correction-processing parameter and changing thereto. For this reason, it is not necessary to carry out calculation processing for setting the correction-processing parameter at the point in time of an instruction for correction of an image being given, and the number of processes can be reduced. Further, the image can be corrected by a simple method. Moreover, since it is not necessary to carry out calculation processing for setting the correction-processing parameter, the time required for outputting the corrected image can be shortened.

In the present embodiment, there was described a case in which an image based on display image data, which is generated based on pre-scan data, is displayed on the monitor 16M and an image based on printing image data, which is generated based on fine scan data, is outputted by being recorded on a recording material in the laser printer section 18. However, the present invention is not limited to the same. For example, there may also be applied a system in which an image based on display image data is recorded on a recording material and an image based on printing image data is displayed on the monitor 16M, thus outputted. However, the image based on the display image data generated based on the pre-scan data is provided so as to be temporarily outputted, and therefore, if this image is recorded on recording materials, more waste is generated. Accordingly, the display image data is preferably displayed on the monitor 16M.

Further, in the present embodiment, there was described as an example a case in which one correction processing parameter, which is changed when information which indicates correction of an image is inputted is provided, but the present invention is not limited to the same. For example, there may also be applied a system in which a plurality of correction-processing parameters are in advance set so that respective processing conditions for image processing are different from one another, and information indicating correction of an image is inputted, and at the same time, changing to which correction-processing parameter is specified.

Moreover, in the present embodiment, there was described, as an example, a case in which the correction-processing parameter are set for each image processing (color gradation converting processing, hypertone processing, and hyper-sharpness processing). However, the present invention is not limited to the same, and parameters of a plurality of related image processing are set in sets, and when alteration of parameter for specified image processing is indicated, parameters for other image processing may also be automatically altered.

FIG. 5 shows an example of a case in which parameters for color gradation converting processing, hypertone processing, and hyper-sharpness processing are set in sets (in the following, the sets of parameters are represented by [color gradation converting processing, hypertone processing, and hyper-sharpness processing]). In FIG. 5, as a set of normal processing parameters, [Ad, αd, Xd] is previously set. As sets of correction processing parameters, [A1, α1, X1] and [A2, α2, X2] are previously set.

After image processing based on the set of normal processing parameters, [Ad, αd, Xd], has been effected, when an instruction for correction to change the color gradation converting processing to Al is given by a user, the set of normal processing parameters is changed to the set of correction processing parameters, [A1, α1, X1]. When an instruction for correction to change the color gradation converting processing to A2 is given, correction of an image may preferably be effected by changing to the set of correction processing parameters, [A2, α2, X2].

Further, in the present embodiment, there was described, as an example, a case in which each image is corrected only once. However, the present invention is not limited to the same. For example, with pre-scan data (displayed on the display 16M) subjected to image processing based on a correction processing parameter being visually observed by a user, the correction may be effected repeatedly until an image is brought into a desired output state.

In this case, parameters set in a preceding operation are all returned to normal-processing ones so that the correction is effected for an output state before correction (normal processing state), and thereafter, parameters may also be set for correction processing. At this time, the normal processing parameters provided as basic processing content may also be set by being selected from the parameters set in advance.

As described above, in accordance with the present invention, when a plurality of kinds of processing contents of image processing for original image data are set and information is inputted which indicates correction of an image outputted after the image processing based on a specified processing content, the processing content is changed to on of the other ones set in advance. Accordingly, correction of an image can be made in a simple manner. Further, the time required for outputting the corrected image can be shortened and the image processing can be reduced.

What is claimed is:

1. An image processing apparatus which effects image processing for original image data so as to obtain output image data, comprising:

processing content setting means which sets, based on the original image data, a plurality of kinds of processing contents of at least one kind of image processing for the original image data in advance before image processing;

output means which outputs, based on a specified processing content among the plurality of kinds of processing con-tents set by said processing content setting means, an image represented by the output image data generated by effecting at least one kind of image processing for the original image data;

input means for inputting information which indicates whether an instruction for correction of the image outputted by said output means has been given; and processing content switching means which, when information which indicates the instruction for correction of the image is inputted by said input means, switches the specified processing content of image processing effected for the original image data to another processing content among the plurality of kinds of processing contents.

2. An image processing apparatus according to claim 1, wherein the plurality of kinds of processing contents set by said processing content setting means include processing contents which are set so that processing conditions of a specified image processing differ from one another, and when information which indicates correction relating to the specified image processing is inputted via said input means, said processing content switching means switches a processing content of the specified image processing to other processing content.

3. An image processing apparatus according to claim 1, wherein when the processing content of the specified image processing is switched to other different processing content, said processing content switching means further switches at least one processing content of another image processing relating to the specified image processing to different another processing content.

4. An image processing apparatus according to claim 3, wherein said processing content setting means sets in advance processing contents of other image processing relating to the specified image processing so as to respectively correspond to a plurality of kinds of processing contents set for the specified image processing.

5. An image processing apparatus according to claim 1, wherein when a plurality of kinds of image processing is effected for the original image data, said processing content switching means simultaneously switches respective processing contents of the plurality of kinds of image processing to other processing contents.

6. An image processing apparatus according to claim 1, wherein the plurality of kinds of processing contents set by said processing content setting means include a basic processing content which forms a foundation of processing content of image processing for the original image data, and when information which indicates correction of an image is inputted by said input means, said processing content switching means switches processing content to the basic processing content, and thereafter, changes processing content based on the inputted information.

7. An image processing apparatus according to claim 6, further comprising setting means for setting the basic processing content among the plurality of kinds of processing contents set by said processing content setting means.

8. An image processing apparatus according to claim 1, wherein the image processing includes at least one of gradation conversion processing effected correspondingly to a picture pattern of an image represented by the original image data, local density adjustment processing of the image represented by the original image data, distortion correction processing for correcting distortion in the image represented by the original image data, and color/density correction processing for an entire region of the image represented by the original image data.

9. An image processing method in which image processing is effected for original image data so as to obtain output image data, comprising:

a processing content setting step in which a plurality of kinds of processing contents of at least one kind of image processing for the original image data is set based on the original image data in advance before image processing;

an output step in which an image represented by the output image data generated by effecting at least one kind of image processing for the original image data is outputted based on a specified processing content among the plurality of kinds of processing contents set in said processing content setting step;

an input step in which information which indicates whether an instruction for correction of the image outputted in said output step is inputted; and a processing content switching step in which when information which indicates the instruction for correction of the image is inputted in said input step, the specified processing content is switched to another processing content among the plurality of kinds of processing contents.

10. An image processing method for image processing of original image data using pre-scan processing and fine scan processing so as to obtain output image data, the method comprising the steps of:

performing the pre-scan processing to generate pre-scan data from the original image data, wherein the pre-scan data is converted into display image data;

receiving an instruction for correction of the original image data by reading at least one correction-processing parameter;

performing the fine scan processing based on the at least one correction-processing parameter; and outputting the output image data according to a desired output state correlating to the instruction for correction.

* * * * *